(12) United States Patent
Lowell

(10) Patent No.: US 10,013,240 B2
(45) Date of Patent: Jul. 3, 2018

(54) FINGERPRINTING OF REDUNDANT THREADS USING COMPILER-INSERTED TRANSFORMATION CODE

(71) Applicant: Advanced Micro Devices, Inc., Sunnyvale, CA (US)

(72) Inventor: Daniel I. Lowell, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/188,304

(22) Filed: Jun. 21, 2016

(65) Prior Publication Data

US 2017/0364332 A1   Dec. 21, 2017

(51) Int. Cl.
G06F 9/45       (2006.01)
G06F 8/30       (2018.01)
G06F 11/16      (2006.01)
G06F 8/41       (2018.01)

(52) U.S. Cl.
CPC ........... *G06F 8/30* (2013.01); *G06F 8/41* (2013.01); *G06F 11/1629* (2013.01); *G06F 2201/805* (2013.01)

(58) Field of Classification Search
CPC ...................................................... G06F 8/30
USPC ................................. 717/140–146, 149–151
See application file for complete search history.

(56) References Cited

U.S. PATENT DOCUMENTS

| 7,243,262 B2* | 7/2007 | Mukherjee | G06F 9/3851 712/E9.053 |
| 7,624,448 B2* | 11/2009 | Coffman | G06F 21/552 726/22 |
| 7,716,668 B2* | 5/2010 | Moore | G06F 9/4881 718/103 |
| 7,774,787 B2* | 8/2010 | Leino | G06F 9/526 717/116 |
| 7,861,228 B2* | 12/2010 | Osecky | G06F 11/1497 714/21 |
| 7,865,770 B2* | 1/2011 | Quach | G06F 9/30189 714/11 |
| 8,190,982 B2* | 5/2012 | Wang | G06F 11/1008 714/758 |
| 8,266,697 B2* | 9/2012 | Coffman | H04L 63/14 709/224 |

(Continued)

OTHER PUBLICATIONS

Prashar et al, "SlicK: Slice-based Locality Exploitation for Efficient Redundant", ACM, pp ACM, pp. 95-105, 2006.*

(Continued)

*Primary Examiner* — Anil Khatri

(57) ABSTRACT

A first processing element is configured to execute a first thread and one or more second processing elements are configured to execute one or more second threads that are redundant to the first thread. The first thread and the one or more second threads are to selectively bypass one or more comparisons of results of operations performed by the first thread and the one or more second threads depending on whether an event trigger for the comparison has occurred a configurable number of times since a previous comparison of previously encoded values of the results. In some cases the comparison can be performed based on hashed (or encoded) values of the results of a current operation and one or more previous operations.

20 Claims, 6 Drawing Sheets

(56) References Cited

U.S. PATENT DOCUMENTS

| | | | |
|---|---|---|---|
| 8,359,578 B2* | 1/2013 | Wang | G06F 11/3612 717/126 |
| 9,026,847 B2 | 5/2015 | Sridharan et al. | |
| 9,047,192 B2 | 6/2015 | Sridharan et al. | |
| 9,081,688 B2* | 7/2015 | Hinton | G06F 12/0817 |
| 9,274,904 B2* | 3/2016 | Lyashevsky | G06F 11/00 |
| 9,317,379 B2* | 4/2016 | Gschwind | G06F 11/1474 |
| 9,535,696 B1* | 1/2017 | Gschwind | G06F 9/30079 |
| 9,594,648 B2* | 3/2017 | Hinton | G06F 9/3891 |
| 2005/0193283 A1 | 9/2005 | Reinhardt et al. | |
| 2006/0095821 A1 | 5/2006 | Mukherjee et al. | |
| 2006/0150186 A1 | 7/2006 | Grayver | |
| 2013/0254592 A1 | 9/2013 | Yamada et al. | |
| 2014/0368513 A1 | 12/2014 | Lyashevsky et al. | |
| 2014/0373028 A1 | 12/2014 | Lyashevsky et al. | |

OTHER PUBLICATIONS

Reddy et al, "Understanding Prediction-Based Partial Redundant Threading for Low-Overhead, High-Coverage Fault Tolerance", ACM, pp. 83-94, 2006.*

Wang et al, "Compiler-Managed Software-based Redundant Multi-Threading for Transient Fault Detection", IEEE, pp. 1-13, 2007.*

Long et al, "Minimal Multi-Threading: Finding and Removing Redundant Instructions in Multi-Threaded Processors", IEEE, pp. 337-348, 2010.*

Mukherjee et al, "Detailed Design and Evaluation of Redundant Multithreading Alternatives", IEEE, pp. 99-110, 2002.*

Tseng et al, "Software Data-Triggered Threads", ACM, pp. 703-716, 2012.*

Dobel et al, "Can We Put Concurrency Back Into Redundant Multithreading?", ACM, pp. 1-10, 2014.*

Martynov, "Experimental Study of Protocol-independent Redundancy Elimination Algorithms", ACM, pp. 141-146, 2010.*

Warren, Henry S., "Cyclic Redundancy Check," Chapter 14, Hacker's Delight, Second Edition, Addison-Wesley Longman Publishing Co., Inc., Boston, MA, 2002, 12 pages.

Wadden, J. et al., "Real-World Design and Evaluation of Compiler-Managed GPU Redundant Multithreading," Proceedings of the International Symposium on Computer Architecture (ISCA), Jun. 2014, 12 pages.

Reinhardt, Steven K., et al., "Transient Fault Detection via Simultaneous Multithreading". In Proceedings of the International Symposium on Computer Architecture (ISCA), Jun. 2000, pp. 25-36.

Mukherjee, Shubhendu, et al., "Detailed Design and Evaluation of Redundant Multithreading Alternatives," In International Symposium on Computer Architecture (ISCA), May 2002, 12 pages.

Smolens, Jared C. et al., "Fingerprinting: Bounding Soft-Error Detection Latency and Bandwidth", In ASPLOS, Oct. 2004, 11 pages.

International Search Report and Written Opinion dated Oct. 26, 2017 for PCT/US17/038524, 10 pages.

* cited by examiner

FINGERPRINTING OF REDUNDANT THREADS USING COMPILER-INSERTED TRANSFORMATION CODE

BACKGROUND

Description of the Related Art

Processing units such as central processing units (CPUs), graphics processing units (GPUs), and accelerated processing units (APUs) implement multiple compute units (e.g., processor cores) to process multiple instructions concurrently or in parallel. For example, a GPU can be implemented using multiple compute units that each include multiple processing elements for executing streams of instructions (which are conventionally referred to as "work-items" or "threads") concurrently or in parallel. Compute units that operate according to a single-instruction-multiple-data (SIMD) architecture execute the same instructions using different data sets. The number of threads that can execute concurrently or in parallel on a processing unit such as a GPU can range from tens of threads to thousands of threads and engineers are eager to harness this power for applications beyond the two-dimensional (2-D) or three-dimensional (3-D) graphics applications that are typically implemented on a GPU. However, general-purpose applications require higher levels of fault tolerance than conventional graphics applications in order to avoid application errors or system crashes.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
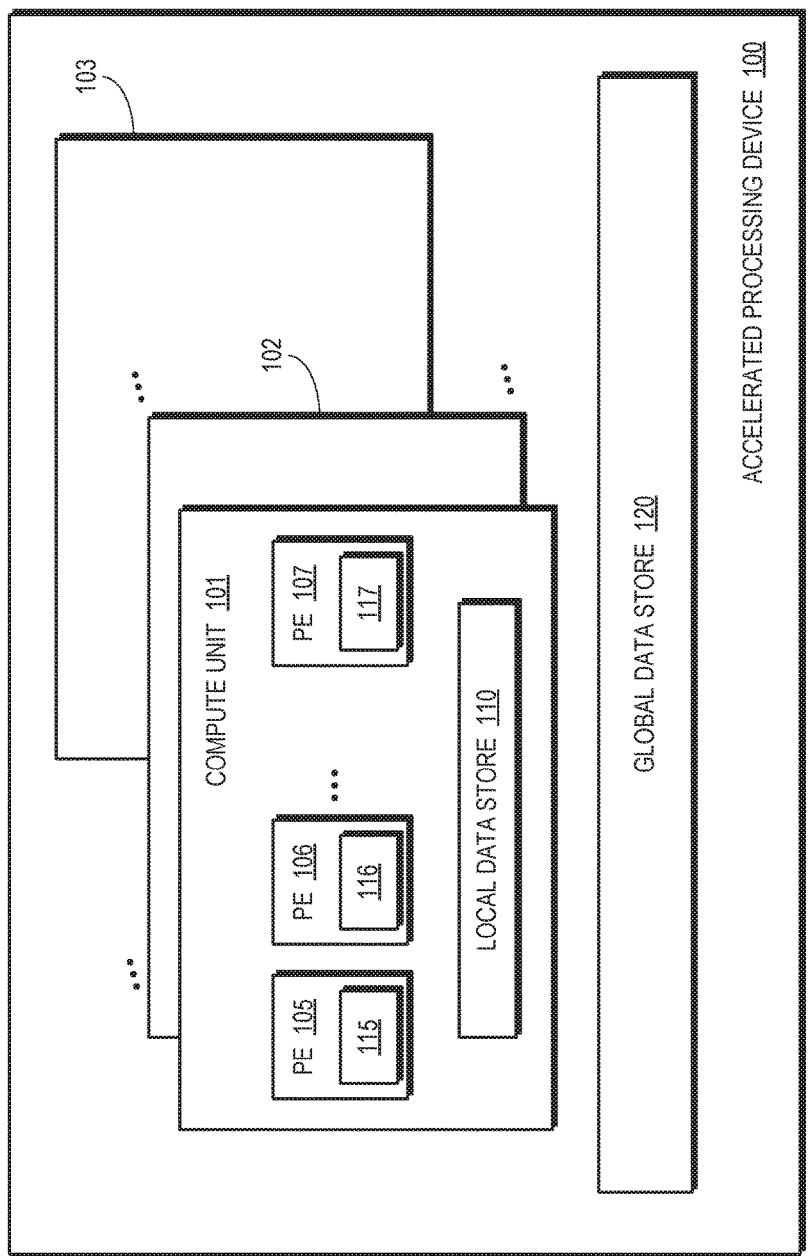
FIG. 1 is a block diagram of an accelerated processing device according to some embodiments.

Redundant multithreading (RMT) can be used improve the reliability of processing units by executing two or more redundant threads on different processing elements and then comparing the results of the redundant threads to detect errors. Detecting a difference between the results produced by two redundant threads executing the same instructions on the same data indicates an error in at least one of the redundant threads. Similarities and differences between results produced by three or more redundant threads executing the same instructions on the same data can be used to detect an error and potentially correct the error, e.g., using voting schemes applied to the three or more results. Mechanisms for passing data between the redundant threads to support RMT error detection or correction incur significant overhead. For example, a spin-lock mechanism may be used to synchronize data and message passing between the redundant threads. The performance of the RMT system can be significantly degraded by the overhead, at least in part because typical RMT systems compare the results produced by the redundant threads before every store instruction (or other event trigger) to avoid storing data that may include an error.

The overhead of a software-implemented RMT error detection or correction mechanism can be reduced, without reducing the error detection accuracy, by selectively bypassing comparisons of results of operations performed by redundant threads depending on whether an event trigger for the comparison (such as execution of a store instruction by the redundant threads) has occurred a configurable number of times (e.g., more than once) since a previous comparison of the results. The overhead associated with storing the results of previous operations for a subsequent comparison can be reduced, without significantly reducing the probability of detecting errors, by hashing together the results produced by the threads with a previously encoded value or an initial value associated with a thread to produce an encoded value for each of the redundant threads. The encoded values form a fingerprint for each thread representative of multiple results associated with multiple event triggers. The values of the fingerprints for the redundant threads are shared-and-compared after a number of event triggers are encountered by the redundant threads. An error is detected if the values of the fingerprints for the redundant threads differ, which triggers an error recovery process in some variations. The redundant threads can include more than two redundant threads, in which case a voting scheme is used to perform error correction by selecting the most common value of the fingerprint as the correct value. Some embodiments of the fingerprint are computed by hashing the results that are to be stored and the address of the stored value with the previous value of the fingerprint.

A compiler is used to transform program code that is executed by redundant threads into a fingerprinting scheme in some variations. The transformation code causes the redundant threads to selectively bypass share-and-compare operations and roll the encoded values for the bypassed share-and-compare operations into a single encoded fingerprint. For example, when the event trigger for the share-and-compare operation is a store instruction, the compiler inserts code to generate a lookup table of codes that are used to hash the results that are to be stored by the redundant threads and the corresponding previous values of the fingerprints. The compiler also initializes a counter for each redundant thread. The counter is incremented in response to the redundant thread executing an event trigger and is used to determine the number of times the share-and-compare operation has been bypassed. The compiler also inserts transformation code to perform the hash, to check whether to bypass or perform the comparison of values of the fingerprint variables of the redundant threads, to share-and-compare values of the fingerprint variables of the redundant threads, and to determine whether an outstanding share-and-compare operation is to be performed before exiting the program code.

FIG. 1 is a block diagram of an accelerated processing device 100 according to some embodiments. The accelerated processing device (APD) 100 can be used to implement different types of processing units such as a central processing unit (CPU), a graphics processing unit (GPU), a general-purpose GPU (GPGPU), an application-specific integrated circuit (ASIC), a field programmable gate array (FPGA), a digital signal processor (DSP), and the like. The APD 100 can be configured to implement one or more virtual machines such as a low-level virtual machine (LLVM) that emulates the operation of a computer system and provides a platform for executing applications. The APD 100 is also configured to implement an operating system and, in some embodiments, the virtual machines each execute a separate instance of the operating system. The APD 100 is further configured to execute a kernel, e.g., to perform operations such as graphics pipeline operations including pixel operations, geometric computations, image rendering, and the like. The APD 100 can also execute non-graphics processing operations such as video operations, physics simulations, computational fluid dynamics, and the like.

The APD 100 includes a plurality of compute units 101, 102, 103 that are collectively referred to herein as "the compute units 101-103." The compute units 101-103 can be configured to operate as pipelines that concurrently execute different instantiations of the same kernel. For example, some variations of the compute units 101-103 are Single Instruction Multiple Data (SIMD) processor cores that execute the same instructions in parallel using different data. Some embodiments of the APD 100 implement more or fewer compute units 101-103.

The compute unit 101 includes processing elements 105, 106, 107 (collectively referred to herein as "the processing elements 105-107"). Some embodiments of the processing elements 105-107 are configured to perform arithmetic and logical operations indicated by instructions that are scheduled for execution by the processing elements 105-107 in the compute unit 101. The compute unit 101 also includes a memory such as a local data store (LDS) 110. The instructions or data that are stored in the LDS 110 are visible to the processing elements 105-107 but are not visible to entities on the compute units 102, 103. Thus, the LDS 110 enables sharing between the processing elements 105-107 on the compute unit 101. The LDS 110 can be implemented using dynamic random access memory (DRAM), embedded DRAM (eDRAM), phase change memory (PCM), and the like. In the interest of clarity, only the processing elements 105-107 and the LDS 110 implemented on the compute unit 101 are shown in FIG. 1. However, the compute units 102 and 103 also include corresponding processing elements and a corresponding LDS.

Each of the processing elements 105-107 executes a separate instantiation of the kernel. The instantiations of the kernel that are executed by the processing elements 105-107 can be referred to as work items, tasks, or threads. In some variations, instructions executed by the threads and the data operated on by the instructions are accessed from the LDS 110. Results of the operations performed by the threads are then stored in the LDS 110. The processing elements 105-107 also include private memories 115, 116, 117 that are collectively referred to herein as "the memories 115-117." The memories 115-117 on each of the processing elements 105-107 are only visible to the corresponding processing element 105-107. For example, the memory 115 is only visible to the processing element 105 and is not visible to the processing elements 106, 107. The memories 115-117 can be implemented using dynamic random access memory (DRAM), embedded DRAM (eDRAM), phase change memory (PCM), and the like.

The APD 100 also includes a global data store (GDS) 120 that is a memory that is visible to all the compute units 101-103 implemented by the APD 100. As used herein, the term "visible" indicates that the compute units 101-103 are able to access information in the GDS 120, e.g., by performing stores to write information to the memory or loads to read information from the memory. The GDS 120 can therefore be used to facilitate sharing between threads that are being executed by processing elements on the compute units 101-103. Some embodiments of the GDS 120 are also visible to other processing units that may be interconnected to the APD 100. For example, the GDS 120 can also be visible to a CPU (not shown in FIG. 1) that is connected to the APD 100. The GDS 120 can be implemented using dynamic random access memory (DRAM), embedded DRAM (eDRAM), phase change memory (PCM), and the like.

Redundant threads are executed by the processing elements 105-107 in the APD 100. Fingerprints can be created for each of the redundant threads by encoding results of operations performed by the threads. The results of operations performed by the redundant threads or the fingerprints for the redundant threads can then be compared to detect (or, in some cases correct) errors that occur during execution of the redundant threads. Comparison of the results or the associated fingerprints is typically performed in response to a trigger event, such as a store instruction, so that any errors are detected or corrected prior to committing the results to memory. Some embodiments of the APD 100 are configured to selectively bypass comparisons of the fingerprints of redundant threads depending on whether an event trigger for the comparison has occurred a configurable number of times since a previous comparison of the encoded values of the results. The configurable number can be set to a value that is greater than or equal to two.

Figure 2:
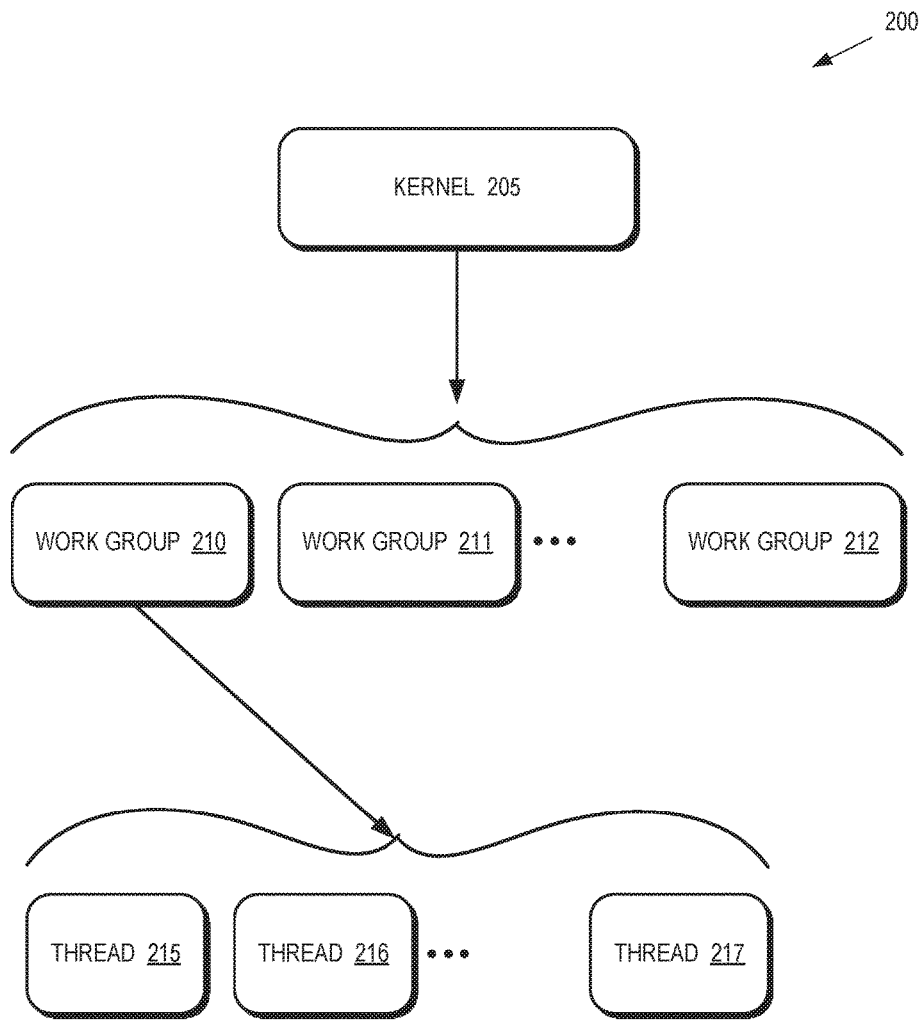
FIG. 2 is a block diagram of a hierarchy of groupings of threads that may be executed on the accelerated processing device shown in FIG. 1 according to some embodiments.

FIG. 2 is a block diagram of a hierarchy 200 of groupings of threads according to some embodiments. Some variations of the hierarchy 200 represent threads that are executed concurrently or in parallel by the APD 100 shown in FIG. 1. The hierarchy 200 includes a kernel 205 that represents program code that can be executed by processing elements such as the processing elements 105-107 shown in FIG. 1. Instantiations of the kernel 205 are grouped into workgroups 210, 211, 212 that are collectively referred to herein as "the workgroups 210-212." Each of the workgroups 210-212 has a local size that defines a number of threads in the workgroup and a group identifier that uniquely identifies each of the workgroups 210-212. In some embodiments, the workgroups 210-212 are collections of related threads that are executed concurrently or in parallel. For example, the workgroup 210 includes the threads 215, 216, 217 that are collectively referred to herein as "the threads 215-217." The threads 215-217 are assigned different local identifiers that identify the threads 215-217 within the workgroup 210. The threads 215-217 are also assigned global identifiers that identify the threads 215-217 globally across threads that are allocated to all of the workgroups 210-212. The threads in each of the workgroups 210-212 can be synchronized with other threads in the corresponding workgroup 210-212.

The workgroups 210-212 are allocated for execution on corresponding compute units. For example, the workgroup 210 can be executed on the compute unit 101 shown in FIG.

1, the workgroup 211 can be executed on the compute unit 102 shown in FIG. 1, and the workgroup 212 can be executed on the compute unit 103 shown in FIG. 1. The threads within the workgroups 210-212 are then scheduled for execution on corresponding processing elements within the allocated compute unit. For example, the thread 215 can be scheduled for execution on the processing element 105 shown in FIG. 1, the thread 216 can be scheduled for execution on the processing element 106 shown in FIG. 1, and the thread 217 can be scheduled for execution on the processing element 107 shown in FIG. 1.

Redundant multithreading (RMT) is implemented by the APD 100 to detect and, in some cases, correct errors that occur during processing of threads such as the threads 215-217. Redundant threads are created by instantiating more than one thread to execute the same instructions using the same data. The redundant threads execute on different processor elements. A global identifier, or a combination of a group identifier and a local identifier, indicates the data that is to be processed by the corresponding thread. For example, the global identifier of a thread can be used to compute memory addresses and make control decisions for the thread. Redundant threads can therefore be created by mapping the global identifiers (or the combination of the group identifiers and the local identifiers) of more than one thread to a single global identifier such that the two threads execute the same kernel code for the same data. Software-implemented RMT techniques are disclosed in U.S. Pat. No. 9,274,904, which is incorporated herein by reference in its entirety. The overhead incurred by software-implemented RMT techniques can be reduced by selectively bypassing comparisons of encoded values (which may also be referred to as fingerprints) of results of operations performed by redundant threads depending on whether an event trigger for the comparison has occurred a configurable number of times since a previous comparison of the encoded values of the results.

Figure 3:
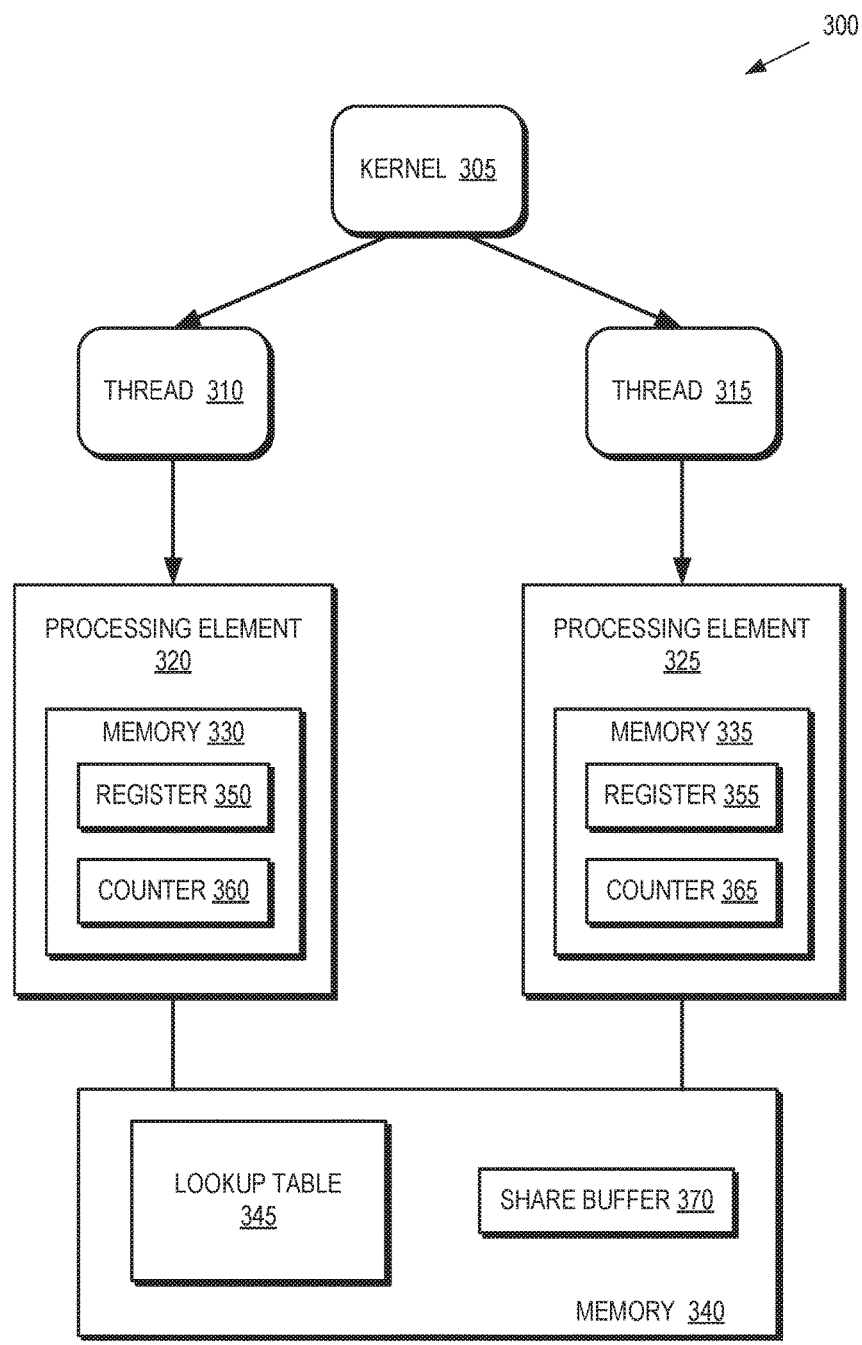
FIG. 3 is a block diagram of an accelerated processing device that selectively bypasses comparisons of fingerprints of redundant threads based on a number of event triggers that occurred since a previous comparison of the fingerprints according to some embodiments.

FIG. 3 is a block diagram of an APD 300 that selectively bypasses comparisons of fingerprints based on a number of event triggers that occurred since a previous comparison of the fingerprints according to some embodiments. The APD 300 is used to implement some embodiments of the APD 100 shown in FIG. 1. The APD 300 is configured to execute a kernel 305. Threads 310, 315 represent redundant instantiations of the kernel 305 that execute the same instructions on the same data. In some embodiments, the threads 310, 315 are identified by the same identifiers, e.g., the same global identifier, group identifier, or local identifier. Although two threads 310, 315 are shown in FIG. 3, other embodiments may include more redundant threads.

The APD 300 includes processing elements 320, 325 for executing the redundant threads. Each of the processing elements 320, 325 includes corresponding private memory 330, 335. Although two processing elements 320, 325 are shown in FIG. 3, some embodiments of the APD 300 may include more processing elements. The APD 300 also includes a memory 340 that is visible to both the processing elements 320, 325. For example, the memory 340 can be a local data store such as the LDS 110 shown in FIG. 1 if the processing elements 320, 325 are implemented by the same compute unit. For another example, the memory 340 can be a global data store such as the GDS 120 shown in FIG. 1 if the processing elements 320, 325 are implemented on different compute units.

A compiler implemented by the APD 300 inserts transformation code into the program code defined by the kernel 305 during compilation. When executed by the threads 310, 315, the transformation code causes the threads 310, 315 to selectively bypass comparisons of fingerprints that are generated by the threads 310, 315 based on results of executing portions or blocks of the program code. The threads 310, 315 selectively bypass the fingerprint comparison depending on whether an event trigger for the comparison has occurred a configurable number of times since a previous comparison of the fingerprints. In some embodiments, the compiler inserts transformation code that causes one or more of the threads 310, 315 to allocate a lookup table 345 that includes code values that are used for hashing the results to generate the fingerprints. For example, a 256 element 8-bit array can be allocated to a thread-group local shared memory space to form the lookup table 345. The transformation code can also cause one or more of the threads 310, 315 to initialize the code values in the lookup table 345. For example, one or more of the threads 310, 315 can insert 256 8-bit unique cache elements into the array that forms the lookup table 345. Some embodiments alternatively perform the hashing using other algorithms that do not require the use of the lookup table 345, such as hashing algorithms based on exclusive-OR operations and the like.

The transformation code inserted into the program code includes register initialization code that causes the threads 310, 315 to initialize corresponding registers 350, 355 for storing values of the fingerprints. For example, the threads 310, 315 can allocate the registers 350, 355 in the corresponding private memories 330, 335. The threads 310, 315 can also use the code values stored in the lookup table 345 to initialize the values of the fingerprints stored in the registers 350, 355. The transformation code also includes counter initialization code that causes the threads 310, 315 to initialize corresponding counters 360, 365 that are used to count the number of times that the threads 310, 315 have bypassed comparing fingerprint values in response to an event trigger such as a store instruction. The threads 310, 315 can initialize the counters 360, 365 to a default value such as zero.

The transformation code includes hash code that causes the threads 310, 315 to hash a current value of a result (and, in some cases, an address of the location that stores the result) into the current value of the fingerprints stored in the corresponding registers 350, 355. For example, if the threads 310, 315 have not bypassed any previous comparisons of the fingerprint values, the current value of a result (such as a value that is to be stored in memory) and an address of the storage location are hashed into an initial value of the fingerprint stored in the corresponding registers 350, 355. For another example, if the threads 310, 315 have already bypassed one or more previous comparisons of the fingerprint values, the current value of the result and the address are hashed into the current value of the fingerprint, which was previously generated based on the previous values of results and addresses that were hashed into the fingerprint in response to bypassing the previous comparison. A skip check is included in the transformation code and is used to compare values of the counters 360, 365 to a configurable value that indicates whether to bypass a comparison or perform the comparison. The configurable value is set to a value greater than one. Larger configurable values may further decrease the overhead incurred by the share-and-compare algorithms that are used to perform error detection by the APD 300.

The transformation code also includes share-and-compare code that causes the threads 310, 315 to share the values in the corresponding registers 350, 355 so that the values can be compared for error detection or correction. For example, if the skip check executed by the thread 310 indicates that the value of the counter 360 is equal to or greater than the configurable value, the thread 310 can share the fingerprint stored in the register 350 by copying a value of the fingerprint from the register 350 to a share buffer 370 that is implemented in the memory 340. Synchronization, spin-lock, or other techniques may be used to coordinate usage of the share buffer 370. The skip check executed by the thread 315 also indicates that the value of the counter 365 is equal to or greater than the configurable value. The thread 315 can then access the shared value of the fingerprint associated with the thread 310 and compare the shared fingerprint to the value of the fingerprint stored in the register 355. If the two values are equal, the APD 300 determines that no error has occurred. If the two values are different, the APD 300 determines that an error has occurred and the APD 300 may initiate an error procedure including error correction.

Figure 4:
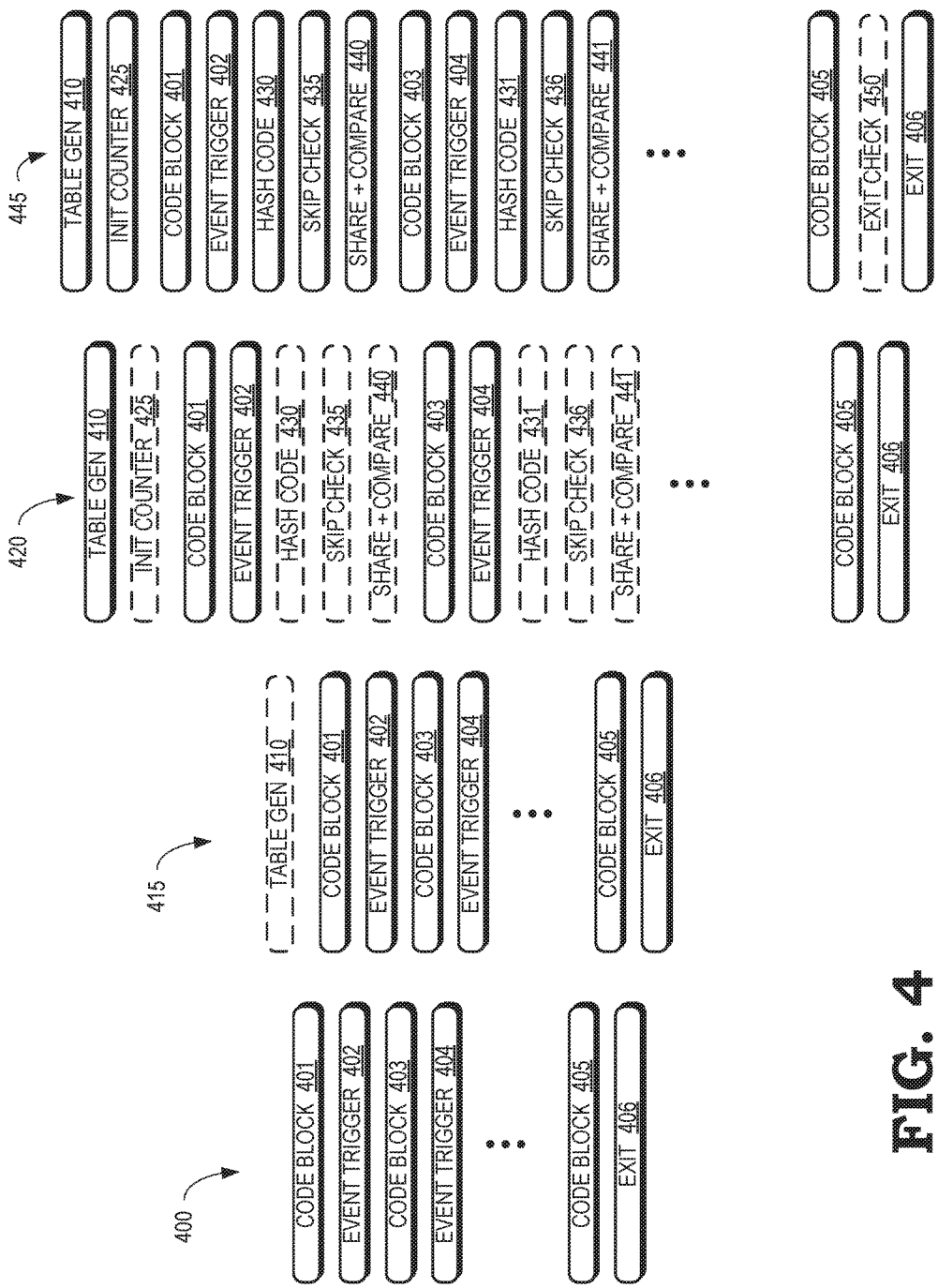
FIG. 4 is a diagram that illustrates modifications of program code by transformation code that is inserted by a compiler during compilation of the program code according to some embodiments.

FIG. 4 is a diagram that illustrates modifications of program code 400 by transformation code that is inserted by a compiler during compilation of the program code 400 according to some embodiments. The program code 400 can be part of the code included in a kernel such as the kernel 205 shown in FIG. 2 or the kernel 305 shown in FIG. 3. The program code 400 includes a code block 401, an event trigger 402, a code block 403, an event trigger 404, a code block 405, and an exit code 406. The event triggers 402, 404 are instructions that trigger a share-and-compare operation that is used to compare fingerprints of redundant threads to detect or correct errors. For example, the event triggers 402, 404 can be store instructions that are used to store values at a location and a memory. The stored values are therefore the results of the event trigger and are used to determine the fingerprint of the corresponding thread, e.g., by hashing the stored value and an address of the storage location with the previous value of the fingerprint or an initial value of the fingerprint. The number of event triggers 402, 404 that are encountered by threads executing the program code 400 may be deterministic or non-deterministic. For example, the code blocks 401, 403, 405 can include loops, conditional instructions, branch instructions, and the like that may lead to different instantiations of the kernel encountering different numbers of event triggers 402, 404 during execution of the program code 400.

The program code 400 is transformed by the compiler during compilation. For example, some variation of the compiler insert table generation code 410 prior to the first code block 401 in the program code 400 so that threads executing the modified program code 415 allocate and initialize a table such as the lookup table 345 shown in FIG. 3. Some embodiments of the table generation code 410 implement a 32-bit cyclic redundancy check (CRC) hashing routine and allocate a 256 element 8-bit array to store encoding values that are used for the CRC hashing routine. For example, the table generation code 410 for allocating and populating the table may be written in pseudocode as:

```
fillCRC32table( ){
    for(int byte=0; byte<256; byte++){
        int c = byte;
        for(int j=0; j<8; j++){
            c = (c&1) ? (0xEDB88320 ^ (c>>1)) : (c>>1);
        }
        storeToCRCTable(c, byte);
}}
```

The compiler further transforms the program code 400 into the modified program code 420 by inserting counter initialization code 425 that is used to initialize counters such as the counters 360, 365 shown in FIG. 3. The modified program code 420 also includes hash code 430, 431 that is inserted following each of the events trigger 402, 404. The hash code 430, 431 is used to hash results associated with the event triggers 402, 404 to form encoded values that represent the fingerprints of the corresponding threads following the event triggers 402, 404. An example of the hash code 430, 431 is written in pseudocode as:

```
genCRC32Hash( ){
    prevHashWorking   = Load(PreviousHashValue)
    resultValWorking  = ValueToBeHashed
    workingHashValue  = 0xFFFFFFFF
    for(int index=0; index<4; index++){
        prevHashValByte = prevHashWorking >> index*8
        prevHashValByte = 0xFF & prevHashValByte
        I1 = workingHashValue ^ prevHashValByte
        I2 = I1 & 0xFF
        I3 = workingHashValue >> 8
        workingHashValue = crcTable[I2] ^ I3
    }
    for(int index=0; index<4; index++){
        resultValByte  = resultValWorking >> index*8
        resultValByte = resultValByte ^ 0xFF
        J1 = workingHashValue ^ resultValByte
        J2 = J1 & 0xFF
        J3 = workingHashValue >> 8
        workingHashValue = crc32tableValue ^ J3
    }
    hashvalfinal = {hashvalfinal ^ 0xFFFFFFFF)
}
```

Skip check code 435, 436 is inserted to determine if the configurable number of event triggers 402, 404 have been encountered by the thread executing the program code 400 since the last share-and-compare with one or more corresponding redundant threads. Share-and-compare code 440, 441 is inserted to cause the thread executing the program code 400 to perform a share-and-compare of its fingerprint value with fingerprint values calculated by one or more redundant threads. The share-and-compare code 440, 441 is only executed if the corresponding skip check code 435, 436 indicates that the thread has encountered the configurable number of event triggers 402, 404 since last share-and-compare for the thread.

The final transformed code 445 is generated by inserting an exit check 450 that is used to determine whether there are any outstanding share-and-compare operations that are required to be performed before the thread exits the program code 400 at the exit block 406.

Figure 5:
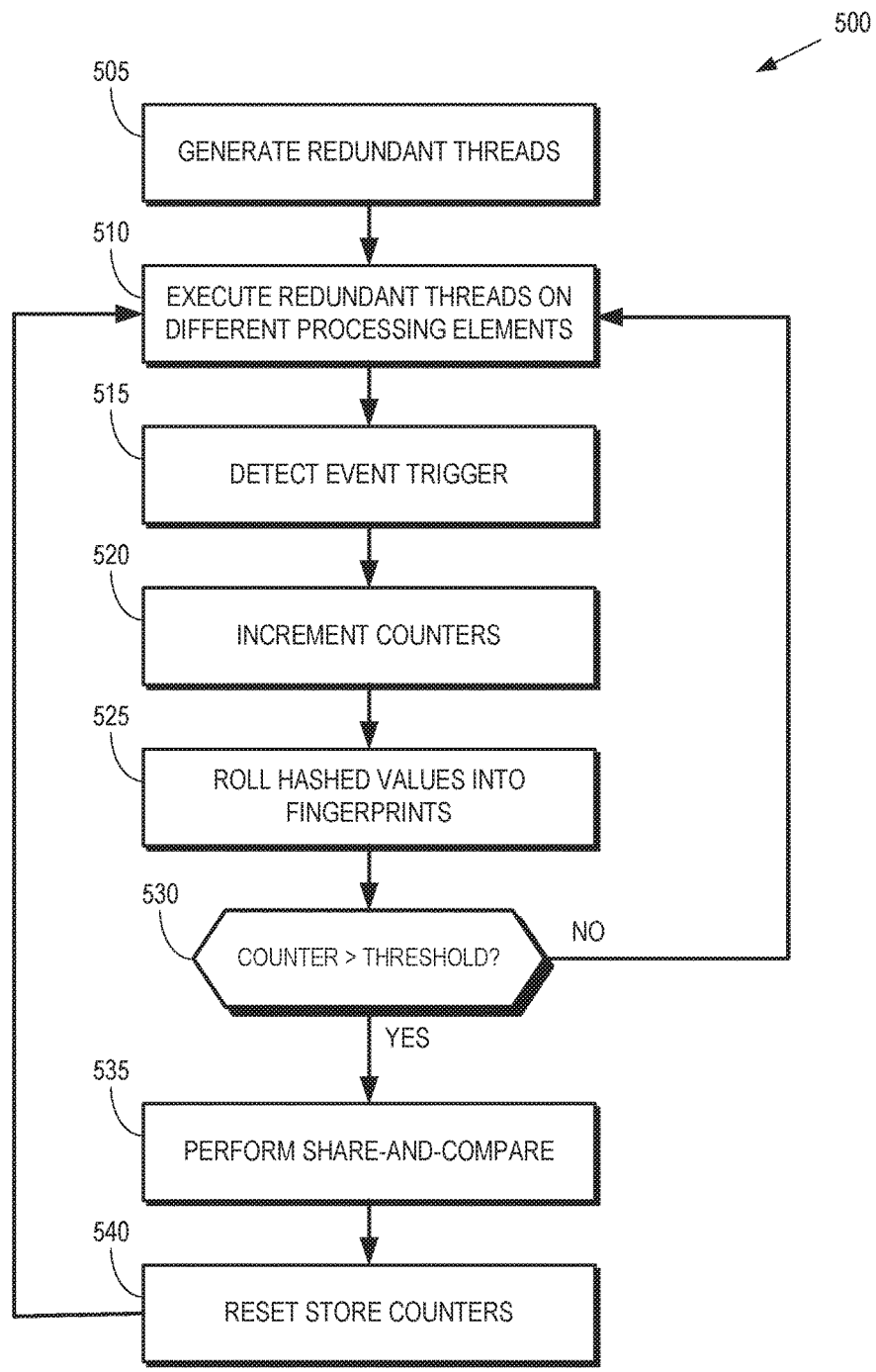
FIG. 5 is a flow diagram of a method for selectively bypassing or performing share-and-compare operations between redundant threads to detect errors according to some embodiments.

FIG. 5 is a flow diagram of a method 500 for selectively bypassing or performing share-and-compare operations between redundant threads to detect errors according to some embodiments. The method 500 is implemented in some embodiments of the APD 100 shown in FIG. 1 or the APD 300 shown in FIG. 3. The APD is configured to execute multiple instantiations of a kernel using multiple threads that are allocated to corresponding processing elements implemented in the APD. A compiler in the APD transforms program code in the kernel to generate transformation code that causes threads executing the instantiations of the kernel to selectively bypass or perform share-and-compare operations. For example, the compiler can transform the program code in the manner illustrated in FIG. 4.

At block 505, the APD identifies a thread for execution and generates one or more threads that are redundant with the identified thread. As discussed herein, the redundant threads can be identified using the same identifier such as a global identifier, a group identifier, or a local identifier. The APD allocates the redundant threads to different processing elements. At block 510, the redundant threads are executed on the different processing elements. The redundant threads can be executed concurrently or in parallel and some embodiments of the redundant threads are synchronized.

At block 515, the threads detect an event trigger (such as a store instruction) that potentially triggers a share-and-compare operation to detect or correct errors. At block 520, the threads increment corresponding counters in response to detecting the event trigger. At block 525, the threads roll hashed values of the results associated with the event trigger (such as the data that is stored in response to the store instruction) into the corresponding fingerprints. For example, in some variations, the threads hash the values of the results into a previous fingerprint generated based on previous results of event triggers. The threads can also hash other information into the fingerprint, such as an address of a location that stores the data indicated by the store instruction.

At decision block 530, the threads compare values in the counters to a threshold value that indicates a configurable number of times that a share-and-compare operation is to be bypassed before performing a share-and-compare operation between the redundant threads. If the counter is less than or equal to the threshold, the method 500 flows to block 510 and continues executing the threads. If the counter is greater than the threshold, the threads perform a share-and-compare operation at block 535 to determine whether the fingerprints for the redundant threads match or not. The APD can determine that an error has occurred if the fingerprints do not match. The APD can perform error reporting or recovery if an error is detected during the share-and-compare operation performed at block 535. At block 540, the threads reset the values of their corresponding counters. The method 500 then flows to block 510 and continues executing the threads.

Figure 6:
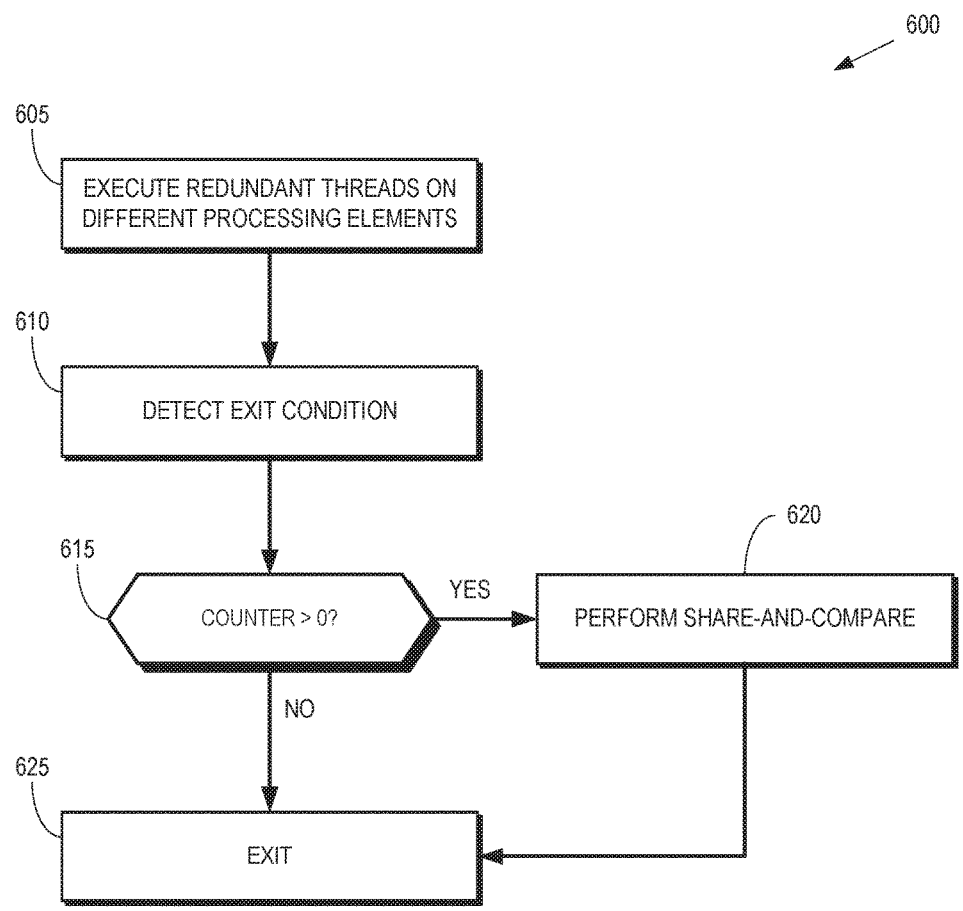
FIG. 6 is a flow diagram of a method for performing an exit check to determine whether to perform a share-and-compare operation between redundant threads before exiting program code according to some embodiments.

FIG. 6 is a flow diagram of a method 600 for performing an exit check to determine whether to perform a share-and-compare operation between redundant threads before exiting program code according to some embodiments. The method 600 is implemented in some embodiments of the APD 100 shown in FIG. 1 or the APD 300 shown in FIG. 3. The APD is configured to execute multiple instantiations of a kernel using multiple threads that are allocated to corresponding processing elements implemented in the APD. A compiler in the APD transforms program code in the kernel to insert an exit check. For example, the compiler can transform the program code 400 to insert an exit check 450 in the manner illustrated in FIG. 4.

At block 605, the redundant threads are executed on the different processing elements. The redundant threads can be executed concurrently or in parallel and some embodiments of the redundant threads are synchronized. At block 610, the threads detect an exit condition. At decision block 615, the threads check values of their corresponding counters in response to detecting the exit condition. If the value of the counter is greater than zero (or some other default value), indicating that at least one share-and-compare operation has been bypassed since the last share-and-compare operation was performed between the redundant threads, the method flows to block 620. At block 620, the threads perform a share-and-compare based on the current values of their fingerprints. The method 600 then flows to block 625 and the threads execute the exit code. If the value of the counter is equal to zero (or some other default value) indicating that there are no outstanding share-and-compare operations, the method 600 flows directly to block 625 and the threads execute the exit code.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   executing redundant threads on corresponding processing elements;
   generating encoded values of results of operations performed by the redundant threads by hashing the results with at least one of a previous encoded value and an initial value, wherein the encoded values are generated in response to the redundant threads executing event triggers for comparisons of the results; and
   selectively bypassing at least one comparison of the encoded values depending on whether the event trigger has occurred a configurable number of times since a previous comparison of previously encoded values of the results.

2. The method of claim 1, wherein the configurable number is greater than one.

3. The method of claim 1, wherein the event trigger is a store instruction executed by the redundant threads to store the results to a memory.

4. The method of claim 1, wherein executing the redundant threads on the corresponding processing elements comprises concurrently executing the redundant threads on the corresponding processing elements.

5. The method of claim 1, further comprising:
modifying program code that is to be executed by the redundant threads by inserting code during compilation to generate a lookup table of code values that are used to hash the results.

6. The method of claim 5, wherein modifying the program code during compilation further comprises initializing a counter for each of the redundant threads, wherein each counter is incremented in response to the redundant threads executing the event trigger, and wherein the value of the counter is compared to the configurable number to determine whether to selectively bypass the at least one comparison.

7. The method of claim 6, wherein modifying the program code during compilation further comprises inserting code to hash the results to generate the encoded values, to compare the value of the counter to the configurable number to determine whether to selectively bypass the at least one comparison, and to share-and-compare the encoded values between the redundant threads in response to determining that the event trigger for the comparison has occurred the configurable number of times.

8. The method of claim 7, wherein modifying the program code during compilation further comprises inserting code to determine whether an outstanding share-and-compare operation is to be performed before the redundant threads exit the program code.

9. An apparatus comprising:
a first processing element to execute a first thread; and
at least one second processing element to execute at least one second thread that is redundant to the first thread, wherein the first processing element and the at least one second processing element encoded values of results of operations performed by the first thread and the at least one second thread, respectively, by hashing the results with at least one of a previous encoded value and an initial value, wherein the encoded values are generated in response to the first thread and the at least one second thread executing event triggers for comparisons of the results, and wherein the first processing element and the at least one second processing element are to selectively bypass at least one comparison of the encoded values depending on whether the event trigger has occurred a configurable number of times since a previous comparison of previously encoded values of the results.

10. The apparatus of claim 9, wherein the configurable number is greater than one.

11. The apparatus of claim 9, wherein the event trigger is a store instruction executed by the redundant threads to store the results.

12. The apparatus of claim 9, wherein the first thread and the at least one second thread are executed concurrently by the first processing element and the at least one second processing element respectively.

13. The apparatus of claim 9, further comprising:
a plurality of processing elements that include the first processing element and the at least one second processing element, wherein the plurality of processing elements implement a compiler configured to modify program code that is to be executed by the first thread and the at least one second thread by inserting code during compilation to generate a lookup table of code values that are used to hash the results to generate the encoded values.

14. The apparatus of claim 13, further comprising:
a memory configured to implement counters for the first thread and the at least one second thread, wherein the compiler is configured to initialize the counters, wherein the first thread or the at least one second thread increment the corresponding counter in response to executing the event trigger, and wherein the values of the counters are compared to the configurable number to determine whether to selectively bypass the at least one comparison.

15. The apparatus of claim 14, wherein the compiler is configured to insert code to hash the results, to compare the values of the counters to the configurable number to determine whether to selectively bypass the at least one comparison, and to share-and-compare the encoded values between the first thread and the at least one second thread in response to determining that the event trigger for the comparison has occurred the configurable number of times.

16. The apparatus of claim 15, wherein the compiler is configured to insert code to determine whether an outstanding share-and-compare operation is to be performed before the first thread and the at least one second thread exit the program code.

17. A non-transitory computer readable medium embodying a set of executable instructions, the set of executable instructions to manipulate at least one processor element to:
execute redundant threads on corresponding processing elements;
generate encoded values of results of operations performed by the redundant threads by hashing the results with at least one of a previous encoded value and an initial value, wherein the encoded values are generated in response to the redundant threads executing event triggers for comparisons of the results; and
selectively bypass at least one comparison of the encoded values depending on whether the event trigger has occurred a configurable number of times since a previous comparison of previously encoded values of the results.

18. The non-transitory computer readable medium of claim 17, wherein the at least one processor element is to initialize a counter for each of the redundant threads, wherein each counter is incremented in response to the redundant threads executing the event trigger, and wherein the value of the counter is compared to the configurable number to determine whether to selectively bypass the at least one comparison.

19. The non-transitory computer readable medium of claim 18, wherein the at least one processor element is to insert code to hash the results with at least one of a previous encoded value and an initial value to generate encoded values, to compare the value of the counter to the configurable number to determine whether to selectively bypass the at least one comparison, and to share-and-compare the encoded values between the redundant threads in response to determining that the event trigger for the comparison has occurred the configurable number of times.

20. The non-transitory computer readable medium of claim 19, wherein the at least one processor element is to insert code to determine whether an outstanding share-and-compare operation is to be performed before the redundant threads exit a program code.

* * * * *